Feb. 11, 1969   J. V. LEWALLEN   3,427,657
TRACTOR-TRAILER FIFTH WHEEL BEARING
Filed Oct. 26, 1966
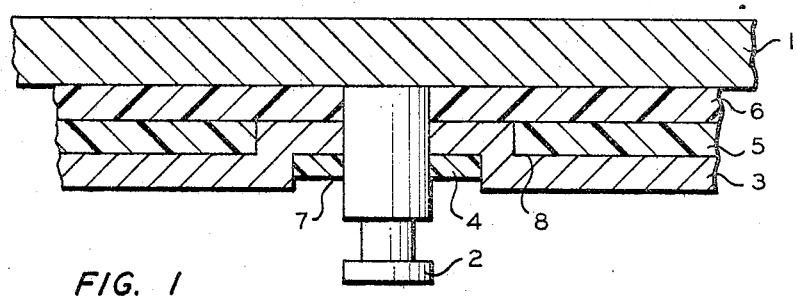
FIG. 1
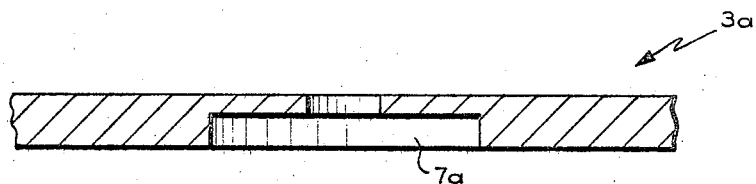
FIG. 2
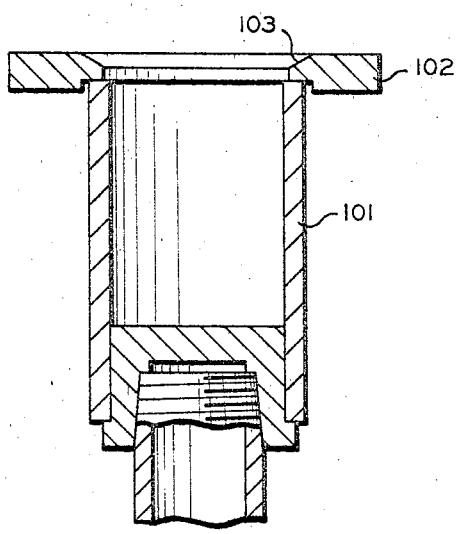
FIG. 3
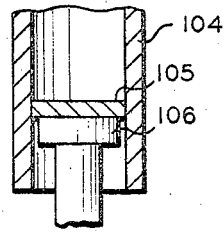
INVENTOR.
J. V. LEWALLEN
BY *Young & Quigg*
ATTORNEYS

United States Patent Office 3,427,657
Patented Feb. 11, 1969

3,427,657
TRACTOR-TRAILER FIFTH WHEEL BEARING
John V. Lewallen, Bartlesville, Okla., assignor to Phillips Petroleum Company, a corporation of Delaware
Filed Oct. 26, 1966, Ser. No. 589,696
U.S. Cl. 308—136
Int. Cl. F16c 17/00, 19/00, 21/00
5 Claims

ABSTRACT OF THE DISCLOSURE

A bearing assembly for a fifth wheel-king pin coupling between a tractor and a trailer comprises a plurality of solid detachable lubricating disks on the king pin, these disks being held in place on the king pin by a metal back-up plate which contacts substantially the entire undersurface of the disks so that they will not droop when the trailer is uncoupled from the tractor. A retainer ring with a friction fit to the king pin holds the back-up plate in place. The retaining ring is forced onto the king pin by means of a tubular shank member having a detachable flange which flange contacts the retainer ring. After the retainer ring is substantially positioned the flange can be removed and portions of the retainer ring which have been deformed by being forced over the king pin can be pushed on into place by means of pressure exerted by the tubular shank member.

---

This invention relates to couplings for tractors and trailers. In another aspect, this invention relates to a self-lubricating bearing which is held symmetrically about a trailer king pin by a retaining ring when the king pin is uncoupled from the fifth wheel on a tractor. In still another aspect, this invention relates to a novel tool for installing a retaining ring for a self-lubricating bearing on a trailer king pin.

A standard coupling unit between a tractor and a trailer is the fifth wheel assembly wherein the tractor carries the fifth wheel having a socket for reception of a king pin carried by the trailer. This connection provides for relative rotating movement between the tractor and the trailer, and it requires lubrication for maximum efficiency of operation of the tractor and trailer assembly. One method of providing this lubrication is to place a lubricating washer on the trailer king pin which will rest between the tractor and trailer when the two are connected.

A thin plastic lubricating disk positioned about the king pin and between the tractor and trailer has been used to provide the necessary lubrication. This disk is normally made from a self-lubricating material such as polyethylene or polypropylene. However, problems have occurred when connecting the trailer to the tractor with the thin plastic disk located therebetween. Normally, two men are required for the hook-up, one to hold the plastic disk on the king pin and the other to back the truck. This results in an expensive and dangerous coupling operation. Problems have also occurred when the plastic disk is held upon the king pin by a retaining washer due to the sagging of the disk. When this occurs, the disk many times becomes folded in one or more places which results in tearing and permanent warping or creasing of the disk.

The use of the self-lubricating plastic disk with the resulting sliding friction between the plastic to metal surfaces substantially reduces the sliding friction between metal to metal surfaces that occurs without the aid of the self-lubricating plastic disk. However, there is needed a self-lubricating bearing which further reduces steering effort by reducing the frictional turning coefficient between the tractor and the trailer due to plastic to metal sliding friction.

Therefore, one object of this invention is to provide a novel self-lubricating tractor-trailer fifth wheel bearing which results in a minimum steering effort for the towing tractor.

Another object of this invention is to provide a self-lubricating fifth wheel bearing which is held symmetrically about a trailer king pin while the king pin is being coupled with the fifth whel on a trailer.

A further object of this invention is to provide a tool for installing a self-lubricating bearing retaining ring on a trailer king pin.

According to one embodiment of this invention, there is provided a metal back-up plate for retaining plastic lubricating disks symmetrically about a trailer king pin when coupling the king pin to a receptacle in a fifth wheel on a tractor.

According to another embodiment of this invention, there is provided a bearing assembly for a fifth wheel coupling having at least two self-lubricating disks therein which permit rotational slippage between plastic to plastic surfaces which is substantially lower than metal to metal and metal to plastic rotational slippage. This results in minimum steering effort for the towing tractor.

This invention can be more fully understood by reference to the drawings.

FIGURE 1 is a cross-section of a retaining ring and a metal back-up plate holding two self-lubricating disks on a king pin on a trailer.

FIGURE 2 is a cross-section of an alternative metal back-up plate that can be used in this invention.

FIGURE 3 is a cross-section of a retaining ring installation tool.

Now referring to FIGURE 1, king pin 2 carried by trailer body 1 has self-lubricating disks 5 and 6 attached thereto which in turn are held symmetrically about the trailer king pin 2 by metal back-up plate 3 and retaining ring 4. Retaining ring 4 may be either a tight-fitting plastic ring made of polyethylene, polypropylene, or the like, or a serrated metal lock ring which is pressed on king pin 2 and fits in recess 7 of metal back-up plate 3. Self-lubricating disks 5 and 6 can be made from any self-lubricating material such as polyethylene, polypropylene, nylon, Teflon, polyvinylchloride, and the like. Self-lubricating disk 5 which has a larger inner diameter than self-lubricating disk 6 fits within cutout 8 of metal back-up plate 3, and self-lubricating disk 6 fits around king pin 2. Metal back-up plate 3 can be either a round or a rectangular plate having a centrally located aperture therethrough for receiving king pin 2.

FIGURE 2 illustrates an alternative design 3a for metal back-up plate 3. Metal back-up plate 3a is similar to metal back-up plate 3 except that it is thicker due to the omission of cutouts 8. When using metal back-up plate 3a, one or more self-lubricating disks 6 can be used in the bearing. This is particularly advantageous when the metal back-up plate is made of a light-weight material such as aluminum. However, when the metal back-up plate is made of steel, the design of metal back-up plate 3 is preferred because of its lighter weight.

It must be noted that when using metal back-up plate 3a, one thicker self-lubricating ring or several thinner self-lubricating rings can be used as desired. However, it is preferred to use at least two self-lubricating disks in order to provide the plastic to plastic sliding friction coefficient. It is readily seen that when the metal back-up plate of this invention is utilized the self-lubricating disks will not droop when the trailer is uncoupled from the tractor and the coupling operation can be carried out by only one man.

FIGURE 3 is a section of a tool for installing a retainer ring on a trailer king pin. Tubular shank member 101 has a larger inside diameter than the diameter of the trailer king pin. Flange 102 is positioned around the upper periphery of tubular shank 101 and has a downward incline slope 103 around the inside diameter thereof to receive any formed material from around the inner diameter of the retaining ring that is being forced on the king pin. Force transfer member 104 is screwed into the lower portion of tubular shank 101. Stop 105 is shown resting upon the lifting head 106 of a hydraulic jack mechanism (not shown).

Thus, in the operation of the tool, the tool is positioned under a trailer king pin so that tubular shank member 101 will slide thereon when force is applied to the hydraulic jack. A retaining ring to be forced on the king pin is then placed on flange 102. A metal back-up plate carrying one or more self-lubricating disks is then placed concentrically on the retaining ring carried by flange 102. The hydraulic jack is then actuated to force lifting head 106 upward and to cause the self-lubricating disks and the metal back-up plate to pass on the king pin. As the vertical lift is continued, the retaining ring is forced uniformly on the shank of the king pin, and the king pin will extend into tubular shank 101 until the desired position of the combined bearing on the shank is obtained. As previously stated, the retaining ring can be either a tight-fitting plastic or serrated metal lock ring, and as the ring is being forced upon the king pin, the inclined slopes 103 receive any deformed material from around the inner diameter of the retaining ring.

When using only serrated metal lock rings, it has been found that the serrated metal portions which are deformed aronud the interior diameter of the ring as it is forced on the king pin protrude downward beyond the recess in the metal back-up plate. In order to prevent this unwanted protrusion which results in undue friction between the bearing and the trailer fifth wheel, it becomes necessary to force these protruding portions upward without springing or breaking the lock ring. This can be accomplished with the installation tool illustrated in FIGURE 3, which has a removable flange 102. Thus, after the bearing has been positioned on the shank of the king pin, the hydraulic jack is lowered until tubular shank 101 is removed from the king pin. Flange 102 is then removed from the upper periphery of shank 101 and the hydraulic jack is actuated to force shank 101 upward and on the king pin until the upper periphery of shank 101 contacts the protruding metal. Force is then applied until the deformed metal portions are pushed into the recess in the metal back-up plate. In this manner, the serrated metal lock rings can be forced onto the king pin shank, and into the recessed portion of the metal back-up plate without springing or breaking them.

The use of a hydraulic jack mechanism is not intended to limit the scope of the invention. Any type (automobile) jack or vertical lifting device can be used to lift tubular shank 101 over the king pin, and the lower portion of force transfer member 104 can be altered in any suitable manner to receive the lifting head or lifting portion of the jack mechanism used.

Although the embodiments of this invention have been described with a certain degree of particularity, it is manifest that many changes may be made in the details of construction in the arrangement of component without departing from the spirit or the scope of this disclosure as set forth in the appended claims.

I claim:
1. In combination with a fifth wheel connecting a tractor and trailer, a king pin on said trailer, at least two solid detachable lubricating disks on said king pin, a metal back-up plate under said solid detachable lubricating disks on said king pin, said metal back-up plate having a concentric recessed annular portion on the underside thereof, and a retaining ring underneath said metal back-up plate, said retaining ring adapted to fit into the concentric recessed annular portion on the underside of said metal back-up plate and held in frictional locked engagement with said king pin thereby holding said metal back-up plate to said king pin and whereby the coefficient of friction between said disks is less than the coefficient of friction between said back-up plate and a member on the tractor on which it is adapted to be mounted.

2. The bearing assembly of claim 1 having two solid detachable lubricating disks made from polyethylene or polypropylene.

3. The bearing assembly of claim 1 wherein said retaining ring is an annular disk having an initial inner diameter less than the diameter of said king pin, said retaining ring being made of polyethylene and polypropylene.

4. The bearing assembly of claim 1 wherein said metal back-up plate has a recess on the upper side thereof, said recess being concentric with and radially offset from said king pin.

5. The bearing assembly of claim 4 having a first solid detachable lubricating disk made of polyethylene or polypropylene adapted to fit in the recessed portion on the upper side of said metal back-up plate, and a second solid detachable disk made of polyethylene or polypropylene on said king pin above said metal back-up plate.

References Cited

UNITED STATES PATENTS

| | | | |
|---|---|---|---|
| 154,063 | 8/1874 | McClelland | 308—136 |
| 2,878,047 | 3/1959 | Booth | 308 |
| 3,275,390 | 9/1966 | Franks | 308—136 |
| 3,337,277 | 8/1967 | Arnold | 308—136 |

MARTIN P. SCHWADRON, *Primary Examiner.*

FRANK SUSKO, *Assistant Examiner.*